March 3, 1959 J. C. HESELWOOD 2,875,620

RADIO TUNERS

Filed March 3, 1955 2 Sheets-Sheet 1

INVENTOR.

JAMES CLEMENT HESELWOOD

BY

Busser, Smith & Harding

ATTORNEYS

March 3, 1959 J. C. HESELWOOD 2,875,620

RADIO TUNERS

Filed March 3, 1955 2 Sheets-Sheet 2

INVENTOR.
JAMES CLEMENT HESELWOOD
BY
Busser, Smith & Harding
ATTORNEYS

United States Patent Office 2,875,620

Patented Mar. 3, 1959

2,875,620

RADIO TUNERS

James Clement Heselwood, Havertown, Pa., assignor to Radio Condenser Company, Camden, N. J., a corporation of New Jersey Application March 3, 1955, Serial No. 491,907

11 Claims. (Cl. 74—10.7)

This invention relates to radio tuners and has particular reference to tuners in which tuning may be selectively effected in so-called signal seek fashion, by push button operation or by manual knob tuning.

Heretofore there have been in widespread use automobile radio tuners of push button type in which stations are selected through the manipulation of push buttons, the mechanism being preliminarily set up so that each push button corresponds to a particular transmitting frequency, the set up usually being made so that these frequencies correspond to those transmitting stations in the vicinity in which the automobile operator usually drives. Inasmuch as on occasions the owner of an automobile radio will depart from the vicinity of such stations, it is necessary additionally to provide a tuning knob by which the operator may tune in any station within the tuning band of the receiver.

Manual tuning by means of a knob necessarily requires some extended manipulation by a driver taking his attention from the road, and while the provision of push buttons makes for more ready accomplishment of tuning with a minimum of attention on the part of the driver, the fact that the number of stations so tunable is generally limited makes desirable the possibility of tuning transmitting stations by means of signal seek operation in which the operator by momentarily pressing a bar or button may produce a tuning adjustment from a previously selected station to the next station in order of frequency which produces sufficient signal to produce automatic stoppage of the signal seeking operation the action of which has been initiated.

Signal seek tuning is not, in itself, completely satisfactory since if it is desired to change the tuning from one station to a particular other station it is necessary, in general, to tune through one or more intermediate stations each of which will stop the tuning operation, necessitating multiple operations of the initiating member. This is particularly objectionable in larger metropolitan areas where a large number of transmitting stations will produce strong signals sufficient to stop the progress of signal seek tuning. Furthermore, signal seek receivers are generally, to avoid complexity, made to seek in only one direction across the band, and accordingly if a station is desired which lies opposite the direction of the automatic seek it is impossible to reverse the direction of seek, but instead the seek operation must be carried out to one end of the band and thereupon caused to proceed from the opposite end of the band with many stoppages. Additionally, it is sometimes difficult to determine whether the desired station has been selected as, for example, if the tuning is accomplished during a commercial, so that upon each signal seek selection the operator may be required to pause an appreciable time to determine whether or not the tuning has reached the desired station.

The various advantages and disadvantages of the types just mentioned of the several types of tuners have led to proposals to provide combination signal seek and push button tuners capable of both types of operation and, as a practical necessity, also capable of being tuned through the rotation of a knob. Through the use of such a tuner, the most desired local stations may be set up for push button tuning and the signal seek operation may then be confined to use in periods when the automobile is outside the range of such local stations. Various proposals have been made for tuners of this combination type, usually involving the setting up of elements connected with the push buttons which will inhibit signal seek stoppage except when the tuning is in the vicinity of desired stations. In such cases, the manipulation of a push button essentially starts signal seek tuning, but stoppage of the tuning does not occur until the desired station frequency is approached, whereupon the stoppage inhibiting devices are rendered inactive and signal seek proceeds to the next station which is presumably the one sought. Such a system, however, involves considerable electrical complexity and critical adjustment, otherwise the signal seek control will still have a range of frequency bands in which it will assume control with considerable uncertainty as to whether it will effect tuning to the station sought. Attempts to secure accuracy involve matters of expense which will take a tuner capable of uniformly certain operation out of a commercial price range, as by requiring accurate pre-tuned circuits, piezo crystals, or the like.

Push button tuners which have been commercially successful involve mechanical tuning under the control of push buttons to adjust ganged condensers or movable cores of tuning coils. Preselecting elements of mechanical type may, in such tuners, be set up and locked and will maintain accurate adjustments indefinitely for the reliable tuning of the selected stations. However, such mechanical push buton tuners involve such mechanical loading of the tuning elements which must be adjusted that without the provision of relatively complex mechanical disconnecting elements there would be required powerful driving means for signal seek purposes which are not only expensive but by virtue of the power involved give rise to serious accentuation of the trouble which has beset many signal seek tuners, namely inertial overrun of heavy rapidly moving parts.

In accordance with the disclosure of my application Serial Number 448,492, filed August 9, 1954, there is provided a combination push button and signal seek tuner, with possibility of manual knob adjustment as well, which overcomes these difficulties permitting, consistently with the highly accurate and dependable push button tuning, the use of a low power, low intertial motor which is ideally adapted for signal seek operation. A motor of this type and a tuner utilizing the same are described in my application, Serial No. 426,222, filed April 28, 1954. The motor referred to is of an "inching" type in which the movable element connected to ganged tuning devices is merely a small light rod, the operation of the motor involving the imparting of minute steps of movement to the rod which comes to rest after each step. As disclosed in my application, this motor serves to move only a light core assembly associated with coils and consequently the motor is required to deliver only a small amount of power. While the motor could be made more powerful, it is desirable that its power output should be low, and under these conditions it is not well adapted for the adjustment of such mechanism as is desirably provided in a mechanical push button tuner wherein a considerable degree of friction is desirably present to hold the movable parts reliably in a position to which they are adjusted.

In accordance with the invention disclosed in said application Serial Number 448,492, one of the features contributing largely to the practicability of the combination tuner is the provision of independent adjusting movements of parts of the tuning elements when, respectively, push button and signal seek tuning are effected. Briefly stated, if, for example, there are provided for tuning relatively movable coils and cores, the cores may be moved for signal seek tuning while the heavier coils are moved for push button tuning. It will be evident that in such case, in order to secure definiteness of push button tuning, the cores should be brought to fixed positions when the coils are adjusted, and, to maintain only a limited range of necessary adjustment, when signal seek tuning is effected the coils should be brought to predetermined positions. This is accomplished in accordance with said application.

The last mentioned characteristics of operation give rise to difficulties in indication on the usual type of dial of the particular frequency which is tuned inasmuch as the relative positions of the members of the tuning elements determine the frequency tuned. It is, therefore, the broad object of the present invention to provide an indicating arrangement which will properly indicate the frequency tuned irrespective of which mode of tuning is actually used.

This broad object of the invention together with subsidiary objects relating particularly to details of construction and operation will become apparent from the following description read in conjunction with the accompanying drawings, in which.

Figure 1:
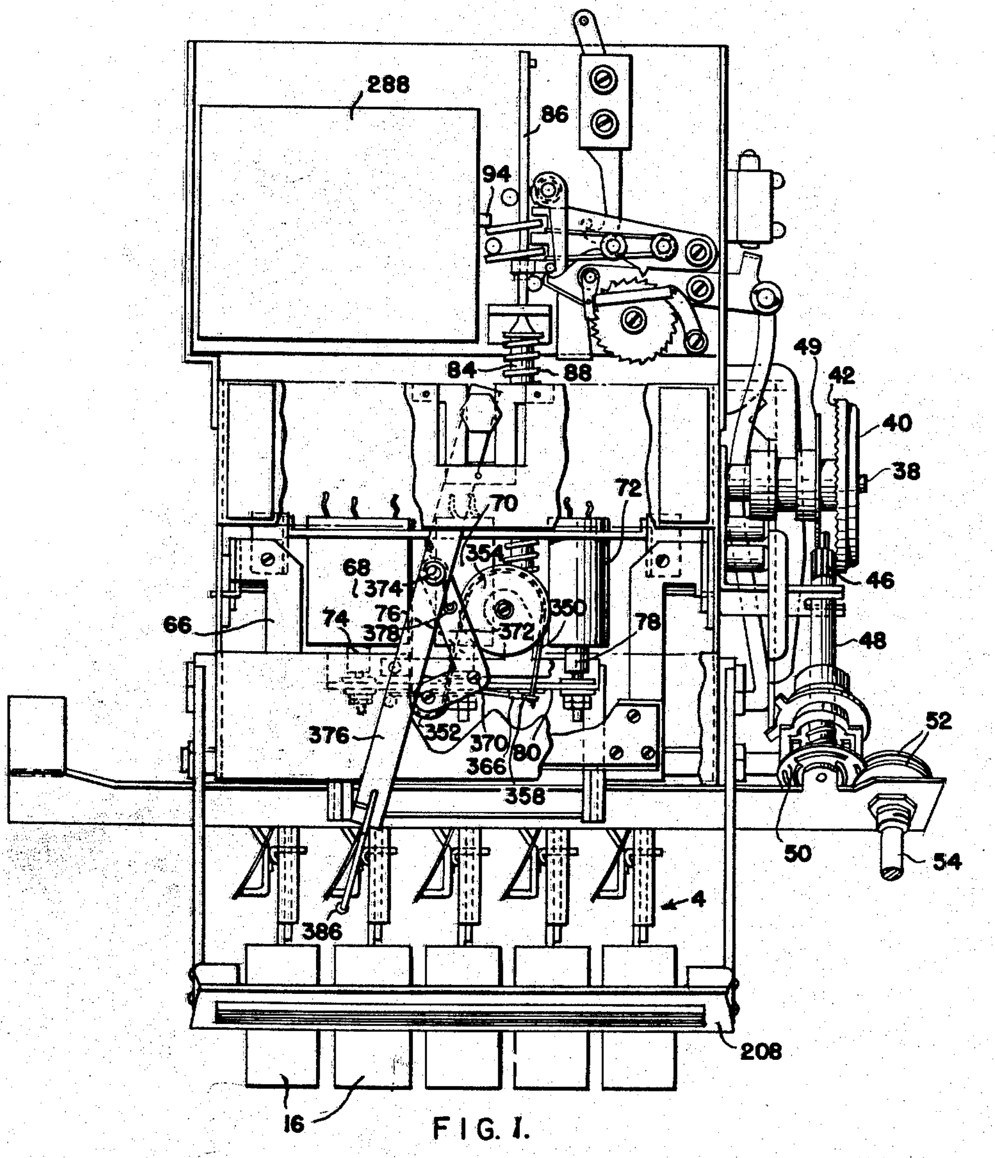
Figure 1 is a plan view, partially broken away, showing a tuner of the type described in my prior application Serial Number 448,492 with indicating means provided in accordance with the present invention associated therewith.
Figure 2:
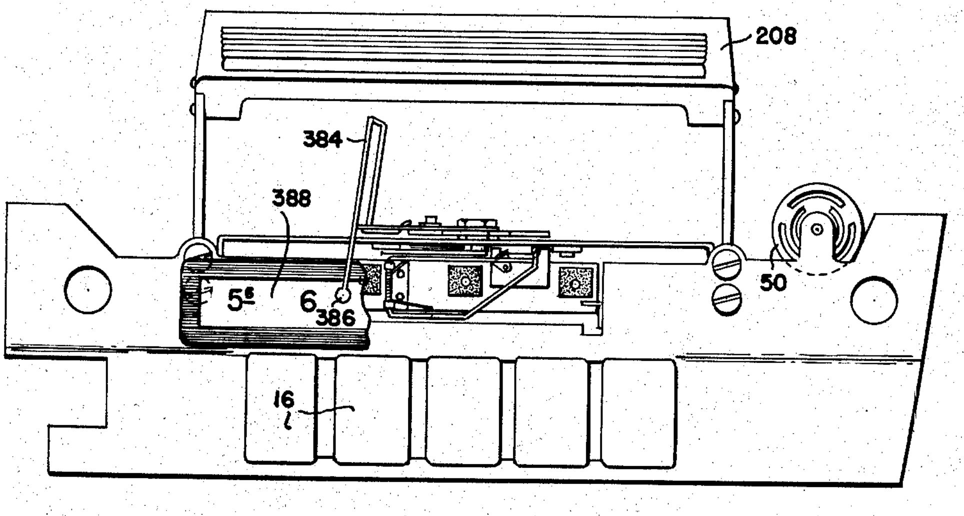
Figure 2 is a front elevation of the tuner with parts broken away to show details.

As is customary in the case of automobile radios, the tuning unit is generally essentially independent of the major parts of the receiver, though physically arranged for association therewith both structurally and electrically. The electrical elements of the complete receiver which are located in the tuner are, in the case of a superheterodyne receiver, inductors or condensers which tune the radio frequency amplifier, the oscillator and the mixer. In other types of receivers, the elements which are required to be tuned are similarly made parts of the tuner. In the present disclosure, the tuner alone is shown and, of that tuner, only those parts are detailed which are directly associated with the indicating means which forms the subject of the invention. The tuner shown is that of my application Serial Number 448,492, and reference may be made thereto for details of construction and operation. A brief outline is herein given of the elements and operations which are more directly concerned with the functions of the indicating means. The numerals applied to the parts herein are the same as those in said application Serial No. 448,492 for ready cross reference.

A plurality of push button assemblies, five in the present case, are indicated at 4 as of the type illustrated and described in Teaf Patent 2,301,090, dated November 3, 1942. The push button assemblies are controlled by means of buttons 16.

A shaft 38 has secured to it a metal disc 40 which is faced with friction material to provide a clutch element cooperating with a crown gear 42 secured to a hub which is journalled upon the shaft 38. A pinion 46 is provided on the inner end of a shaft 48 and is held in mesh with the crown gear 42 by a disc 49 carried by the hub. A flexible disc 50 is carried by the shaft 48 and has its periphery pinched between a pair of flexible discs 52 carried by a manual control knob shaft 54 journalled in the frame.

As described in my application Serial Number 448,492, both the push buttons and the manual knob which rotates shaft 48 serve to move and position a carriage 66 which is mounted for forward and backward movement in the frame and carries coils 68, 70 and 72 which constitute the tuning coils of the receiver, these coils, for example, being the tuning coils of the radio frequency amplifier, the oscillator and the mixer of the superheterodyne receiver or the tuning coils of such other type of receiver as may be involved.

The cores of the coils 68, 70 and 72 are respectively indicated at 74, 76 and 78 and are adjustably carried by a carriage 80 which is slidable forwardly and rearwardly in guideways forming part of the frame. The longitudinal positions of the cores are adjustable for trimming purposes and, once adjusted, they are rigidly held in the carriage 80.

The carriage 80 is secured to a rod 84 which has an extension 86. A spring 88 serves to urge the rod 84 and its extension 86, together with the carriage 80, toward the rear of the tuner.

The rod 84 comprises the driven element of an inching motor of the type described in my application Serial Number 426,222, filed April 28, 1954 and in my application Serial Number 448,492, referred to above. The drive is effected, as described in detail in the last mentioned applications, by means of a vibrating armature 94 which is actuated as part of a driving motor 288. The motor 288 effects signal seeking operation initiated by movement of a bar 208 presented to the operator at the front of the tuner.

Reference may be made to said prior applications for details of construction and operation and for the purposes of the present invention the operation which is involved may be briefly described as follows:

If the cores have previously been displaced by a signal seek operation from their rearmost rest position, initiation of push button tuning by pressure on one of the buttons 16, or initiation of manual knob tuning by rotation of the tuning knob will release the carriage 80 to permit it to be moved to its rearmost position by the action of spring 88. Then by either the continued movement of a push button or the continued rotation of the tuning knob, the coil assembly including the carriage 66 will be adjusted rearwardly to the degree necessary to effect the desired tuning.

If, on the other hand, tuning has previously been accomplished by push button or knob operation, and the coil assembly is therefore out of its forwardmost rest position, the initiation of signal seek operation will cause the coil assembly to move to its forwardmost rest position, the signal seek tuning operation then resulting by the movement of the carrier 80 forwardly under control of the motor 288.

The actual tuning, accordingly, irrespective of how it is effected, starts, in the transition one way or the other between manual tuning on the one hand and signal seek tuning on the other, from rest positions of the coils and cores which involve the maximum penetration of each coil by its corresponding core. Tuning then results from a relative motion of the cores and coils involving a withdrawal of the cores from the coils. Tuning, therefore, proceeds from low frequencies to high frequencies.

Figure 3:
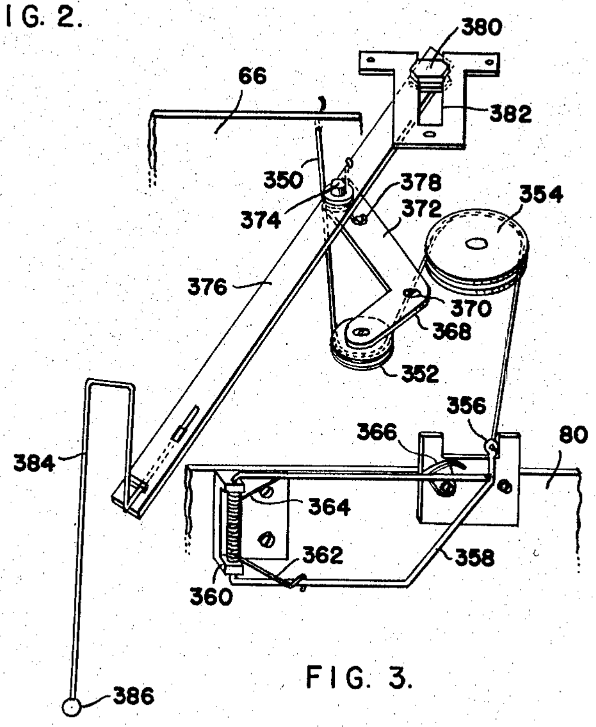
Figure 3 is a perspective view which will particularly indicate the mode of operation of the indicator.

The present invention is concerned with the proper indication of the relative positions of the cores and coils irrespective of which is actually moved while the other retains an initial fixed position. The mechanism for accomplishing this is shown in the several figures and, particularly, may be understood from consideration of Figure 3.

A cord 350 is anchored at its rear end in slide 66 and extends forwardly therefrom about a pulley 352, thence rearwardly about a pulley 354 which is mounted on a fixed axis, and thence forwardly, being anchored at its forward end at 356 in the end of a lever 358 of light construction formed of wire which is pivoted on a vertical axis in a bracket 360 carried by the slide 80. The lower end of a spring 362 urges the lever 358 forwardly, the upper end of the spring reacting against the bracket 360. Because of its light construction, the lever 358 is held against upward movement when in its normal rest position illustrated in Figure 3 by the overlapping action of an adjustable stop 366.

The pulley 352 previously referred to is pivoted on one arm of a bell crank 368 which is pivoted to the frame at 370. The other arm 372 of this bell crank supports on a pivot 374 a link 376, a spring 378 surrounding the pivot normally urging the link 376 in a clockwise direction of rotation about pivot 374. The rear end of link 376 is pivoted to a cross head 380 arranged to slide in a guideway 382 which extends from front to rear of the tuner. At its forward end the link 376 carries a bent wire which at its lower and outer end carries a small ball or pointer 386 which moves adjacent to a scale 388 carrying frequency indications. The linkage arrangement which has been described produces an approximate linear motion of the indicator 386 to traverse the scale 388.

The operation of the indicator is as follows:

Assuming the slide 80 in its rearmost position and the slide 66 in its foremost position, slack is given to the pulley 352 so that the bell crank 372 under the action of spring 378 will rock to its extreme counterclockwise position corresponding to an extreme left-hand position of pointer 386 at the low frequency end of the scale. If the slide 80 moves forwardly in signal seek operation, or if the slide 66 moves rearwardly in push button or tuning knob operation, the cord 350 is stretched out between its ends and the pulley 352 is caused to rock the bell crank 372 clockwise to produce a traversal of the scale toward the right by the pointer 386. The operation thus resulting effects a movement of the pointer 386 which is a function only of the relative positions of the slides 66 and 80, i. e., of the coils and their associated cores. The indication is substantially unique irrespective of whether the relative position is attained through movement of the coils or through movement of the cores. The indicator thus functions to give a proper indication of the frequency tuned in all cases.

The purpose of the lever 358 may now be mentioned. Ordinarily, this lever, due to the action of spring 378 which is considerably stronger than spring 362 in its effect on the end of the lever, holds the lever against the slide 80 in the position shown in Figures 1 and 3. From the effective standpoint of operation, therefore, the forward end of the cord 350 is secured to the slide 80.

However, when a tuning operation is accomplished, a rapid movement of either the slide 80 or the slide 66 occurs restoring one or the other to its initial rest position. While the linkage comprising the bell crank 372 and link 376 and associated parts is of light construction, there is a danger that in the rapid movement of one or the other of the slides the cord 350 would become free of tension and thereby possibly fall from the groove of one of the pulleys 352 or 354. By providing the lever 358 controlled by the light spring 362, the tension on the cord 350 is maintained during such a transitional change to keep it from ever having sufficient slack to fall from the pulleys or to become otherwise entangled in the mechanism.

While the invention has been described with particular reference to a mechanism in which tuning is effected by relative movements of cores and coils, it will be evident that the indicator mechanism may be readily adapted to a tuner in which the tuning is effected by variable capacitors the plate elements of which are controlled from movable slides or other movable elements corresponding to 66 and 80. It will also be evident that details of the mechanism for indicating relative movements of tuning elements may be changed without departing from the invention as defined in the following claims.

What is claimed is:

1. In a tuner, a frame, at least one tuning element comprising a pair of members mounted in the frame each of which is movable relative to the frame, said members conjointly providing a variable impedance, tuning being effected in accordance with the relative positions of said members with respect to each other to vary said impedance, a scale indicative of tuning adjustment, an index element associated with said scale, and means connected to both of said members and controlling the relative positions of said scale and index element in accordance with the relative positions of said members substantially irrespective of the positions of said movable members in the tuner frame.

2. A tuner according to claim 1 in which the scale is fixed and the index element is movable.

3. A tuner according to claim 1 in which means is provided for manual adjustment of one of said members, and in which signal seek driving means is provided to adjust the other of said members.

4. A tuner according to claim 1 in which the means providing for manual adjustment is of knob operated type.

5. A tuner according to claim 1 in which the means providing for manual adjustment is of push button operated type.

6. A tuner according to claim 1 in which the means providing for manual adjustment is of both knob and push button operated type.

7. A tuner according to claim 1 in which said means connected to both of said members comprises a cord connected to said members at its ends and a linkage controlled by the effective slack in said cord.

8. A tuner according to claim 7 in which means is provided to maintain said cord under tension.

9. A tuner according to claim 1 in which said means connected to both of said members comprises a cord connected to said members at its ends, a pair of pulleys about which said cord is trained in zigzag fashion, means providing a fixed axis for one of said pulleys, and a lever mounting the other of said pulleys for control by the effective slack in said cord.

10. A tuner according to claim 9 in which means is provided to maintain said cord under tension.

11. A tuner according to claim 9 in which a spring controls said lever to maintain the cord under tension.

References Cited in the file of this patent

UNITED STATES PATENTS

| | | |
|---|---|---|
| 2,346,399 | Schwarz et al. | Apr. 11, 1944 |
| 2,579,659 | Fisher | Dec. 25, 1951 |
| 2,615,420 | Felt | Oct. 28, 1952 |
| 2,642,746 | Hulst | June 23, 1953 |
| 2,744,193 | Schwarz | May 1, 1956 |
| 2,800,587 | Wright et al. | July 23, 1957 |